(12) United States Patent
Mann et al.

(10) Patent No.: US 12,209,297 B2
(45) Date of Patent: Jan. 28, 2025

(54) POWDER ALUMINUM MATERIAL

(71) Applicant: Obshchestvo S Ogranichennoj Otvetstvennost'yu "Institut Legkikh Materialov I Tekhnologij", Moscow (RU)

(72) Inventors: Viktor Khrist'yanovich Mann, Moscow (RU); Aleksandr Yur'evich Krokhin, Moscow (RU); Roman Olegovich Vakhromov, Moscow (RU); Dmitrij Konstantinovich Ryabov, Moscow (RU); Vladimir Aleksandrovich Korolev, Moscow (RU); Dar'ya Konstantinovna Daubarajte, Moscow (RU); Aleksej Nikolaevich Solonin, Moscow (RU); Aleksandr Yur'evich Churyumov, Moscow (RU)

(73) Assignee: Obshchestvo S Ogranichennoj Otvetstvennost'yu "Institut Legkikh Materialov I Tekhnologij", Moscow (RU)

( * ) Notice: Subject to any disclaimer, the term of this patent is extended or adjusted under 35 U.S.C. 154(b) by 410 days.

(21) Appl. No.: 17/839,396

(22) Filed: Jun. 13, 2022

(65) Prior Publication Data

US 2022/0372599 A1 Nov. 24, 2022

Related U.S. Application Data (63) Continuation of application No. PCT/RU2019/000939, filed on Dec. 13, 2019.

(51) Int. Cl.
| | |
|---|---|
| *C22C 21/16* | (2006.01) |
| *B22F 1/05* | (2022.01) |
| *B22F 9/08* | (2006.01) |
| *B33Y 70/00* | (2020.01) |
| *C22C 21/14* | (2006.01) |

(52) U.S. Cl.
CPC ............ *C22C 21/16* (2013.01); *B22F 1/05* (2022.01); *B22F 9/082* (2013.01); *B33Y 70/00* (2014.12); *C22C 21/14* (2013.01); *B22F 2009/0844* (2013.01); *B22F 2301/052* (2013.01); *B22F 2304/10* (2013.01)

(58) Field of Classification Search
CPC . C22C 21/16; C22C 21/14; B22F 1/05; B22F 9/082; B22F 2009/0844; B22F 2304/10; B22F 2301/052; B33Y 70/00
See application file for complete search history.

(56) References Cited

U.S. PATENT DOCUMENTS

2017/0016096 A1  1/2017  Wentland et al.

FOREIGN PATENT DOCUMENTS

| RU | 2558806 C1 | 10/2015 |
|---|---|---|
| WO | 2017077137 A2 | 5/2017 |
| WO | 2018119283 A1 | 6/2018 |

OTHER PUBLICATIONS

Search Report dated Aug. 28, 2020 in connection with Russian patent application No. 2020118627, 2 pages.
International Search Report and Written Opinion dated Aug. 27, 2020 in connection with International Application No. PCT/RU2019/000939, 8 pages.

*Primary Examiner* — Jessee R Roe
(74) *Attorney, Agent, or Firm* — Baker & McKenzie LLP (57) ABSTRACT

This disclosure relates to the field of metallurgy, namely, to the composition of an aluminum-based heat-resistant alloy and a powder from it to be used for the production of parts using additive technologies. A new aluminum-based material has been created, which is intended for producing a powder and its utilisation in the additive production of various products, which has high processability at laser melting and high strength characteristics in the heat-treated state: the yield strength exceeding 400 MPa, the ultimate strength exceeding 470 MPa, and elongation at break of at least 4%. The powdered aluminum material contains copper, magnesium, manganese, cerium, silicon, zirconium and/or titanium, where the material contains thermally stable $Al_8Cu_4Ce$ dispersoids with a size of less than 1 μm, which are formed at crystallisation rates of at least $10^3$ K/s, which contribute to the material strengthening under operating conditions at room and elevated temperatures.

10 Claims, 8 Drawing Sheets

POWDER ALUMINUM MATERIAL

CROSS-REFERENCE TO RELATED APPLICATIONS

This application is a continuation of and claims priority to PCT Application No. PCT/RU2019/000939, filed on Dec. 13, 2019, titled "Powdered Aluminium Material", which is incorporated herein by reference in its entirety for all purposes.

TECHNICAL FIELD

This disclosure relates to the field of metallurgy, namely, to the composition of an aluminum-based heat-resistant alloy and a powder from it to be used for the production of parts using additive technologies.

BACKGROUND

Additive production technologies are the key area in the development of the automotive and aerospace industries due to the possibility of production of finished products from metal powders in one process cycle according to a given computer model. The material utilisation rate in this type of production can reach 95 to 99%.

For metallic materials, one of the most mastered technologies is the selective laser melting (SLM). In contrast to standard casting technologies for the production of products or blanks, selective laser melting is characterised by high crystallisation rates (the order of $10^4$ to $10^6$ K/s), which leads to the need to use materials that have good casting characteristics and are not prone to hot cracks during printing. In practical work, it was found that alloys of the Al—Si, Al—Si—Mg system possess high processability during SLM due to the large volume fraction of eutectic phases, which minimises defect formation (pores, cracks); however, a significant drawback of these materials is their low strength. The ultimate strength of products made of Al—Si alloys by the SLM method does not exceed 350 MPa after heat treatment.

Among traditional aluminium alloys, the materials based on the Al—Cu system, as well as alloys of aluminum with transition metals, have the highest heat resistance characteristics. Copper-containing alloys are thermally hardened and, while ageing, form metastable phases of the Θ' and S' types in their structure. However, their casting characteristics are at an average level, which makes them almost unsuitable for use in additive production.

Currently important is the development of new compositions of aluminum-based alloys characterised by a high level of mechanical properties at room and elevated temperatures in combination with high processability when used for selective laser melting.

Known in the prior art is an alloy used for production of products by the method of selective laser melting, which has the following composition, wt. %: copper 4.27 to 4.47, magnesium 1.95 to 1.97, and manganese 0.55 to 0.56 (H. Zhang, H. Zhu, T. Qi, Z. Hu, X. Zeng//Materials Science and Engineering: A, 2016, V. 656, P. 47-54).

The alloy is melted with the formation of a dense structure (99.8%), with the yield strength of 276.2 MPa, the ultimate strength of 402.4 MPa, and the elongation at break of 6%. The disadvantage of the known alloy is an inhomogeneous structure and a tendency to form crystallisation cracks, the formation of which is associated with a wide effective range of the alloy crystallisation.

A known aluminum-based alloy includes one or more elements: zinc, magnesium, copper, zirconium, yttrium, erbium, ytterbium, scandium, silver, and random elements and impurities (Application WO 2017/041006 A1, published on Mar. 9, 2017).

The alloy is developed for use in additive production, in particular, for the production of aerospace products. In some embodiments of the disclosure, the alloy may contain the following components, wt. %: zinc 3 to 9, magnesium 2 to 6, copper 0.5 to 2, zirconium up to 0.1; the rest is aluminum and unavoidable impurities. In certain embodiments of the disclosure, the alloy may additionally contain the following components, wt. %: yttrium up to 2, erbium up to 2, ytterbium up to 2, scandium up to 2, manganese up to 2, or silver up to 2. In some embodiments of the disclosure, the alloy may contain, wt. %: zinc 4 to 9, magnesium 0.5 to 3, copper up to 0.5, zirconium about 1; the rest is aluminum and impurities.

A known aluminum-based alloy for production of die castings contains, wt. %: silicon 2.8 to 4.4, iron 1.2 to 2.2, manganese 0.2 to 1.2, copper 0.5 to 3.5, magnesium 0.05 to 0.8, zinc 0, 2 to 3.0, cerium 0.01 to 0.3; the rest is aluminum and impurities.

The alloy is characterised by good plasticity in the as-cast state and processability during high pressure die casting. The disadvantage of this alloy is its low strength after heat treatment (at the level of 310 MPa).

A known high-strength aluminum alloy of A201 (SAE AMS-A-21180) grade contains, wt. %: copper 4.0 to 5.0, magnesium 0.15 to 0.35, titanium 0.15 to 0.35, manganese 0.2 to 0.4, silver 0.4 to 1.0; the rest is aluminum and unavoidable impurities.

This alloy is characterised by high resistance to stress corrosion and good performance at elevated temperatures. Its disadvantage is low strength after heat treatment (the ultimate strength is 414 MPa; the yield strength is 345 MPa).

A known aluminum-based alloy 2219 containing, wt. %: Cu 5.8 to 6.3, Mn 0.2 to 0.4, Ti 0.02 to 0.10, V 0.05 to 0.15, and Zr 0.1 to 0.25, and used for production of deformable semi-finished products (Hatch JE (ed.) Aluminum: Properties and Physical Metallurgy, ASM, Metals. Park, 1984 and Kaufman G. J. Properties of Aluminum Alloys: Fatigue Data and Effects of Temperature, Product Form, and Process Variables, Materials Park, ASM International, 2008, 574 p.), has a satisfactory level of mechanical properties at room temperature and is characterised by good heat resistance within the temperature range of 200 to 300° C. due to the presence of $Al_{20}Cu_2Mn_3$ dispersoids with a volume content not exceeding 1.5 vol. % in the structure. The disadvantage of this material is its low yield strength in an artificially aged state, and also its softening at temperatures above 250° C. due to coarsening of the $Al_2Cu$ phase.

The closest to the claimed alloy is an aluminum-based alloy, which is used for production of products utilising additive technologies, and which contains the following elements (inwt. %): aluminum 78.80 to 92.00, copper 5.00 to 6.00, magnesium 2.50 to 3.50, manganese 0.50 to 1.25, titanium 0 to 5.00, boron 0 to 3.00, vanadium 0 to 0.15, zirconium 0 to 0.15, silicon 0 to 0.25, iron 0 to 0.25, chromium 0 to 0.50, nickel 0 to 1.0, and 0 to 0.15 of other elements and impurities (Application US 2017/0016096 A1, published on Jan. 19, 2017). The alloy is characterised by a high level of characteristics of mechanical properties in comparison with AlSi10Mg alloy and by a low tendency to the formation of crystallisation cracks in comparison with the high-strength aluminum alloys of the AA7075 type. The disadvantage of this alloy is that it is over-alloyed with titanium, boron, and nickel, which is the cause of thermal stresses arising in the synthesised material during the SLM process and which leads to cracking and distortion of products produced using additive technologies.

SUMMARY

The technical objective of this disclosure is the creation of a new aluminum-based material intended for producing a powder and its utilisation in the additive production of various products, which has high processability during laser melting and high strength characteristics in the heat-treated state: the yield strength exceeding 400 MPa, the ultimate strength exceeding 470 MPa, and elongation at break of at least 4%.

The technical result is the solution of the set problem and the achievement of the listed advantages.

To solve the problem and to achieve the technical result, a powder aluminum material based on an aluminum alloy with the following content of components (in wt. %) is provided.

| | |
|---|---|
| Copper | 5.2 to 7.0 |
| Magnesium | 0.2 to 0.8 |
| Manganese | 0.3 to 1.0 |
| Cerium | 0.1 to 0.7 |
| Silicon | 2.8 to 3.7 |
| Zirconium and/or titanium | 0.45 to 0.9 |
| Aluminum and unavoidable impurities | the rest, | where the material contains thermally stable $Al_8Cu_4Ce$ type dispersoids with a size of less than 1 µm, which are formed at crystallisation rates of at least $10^3$ K/s, which contribute to the material hardening under the operating conditions at room and elevated temperatures.

The addition of copper in the claimed amount ensures an increase in the strength characteristics due to the formation of a supersaturated solid solution with subsequent decomposition during artificial ageing, and also contributes to the formation of insoluble strengthening particles.

The addition of cerium is introduced to form a phase of the $Al_8Cu_4Ce$ type, which is characterised by high thermal stability and low tendency to grow during heating; in addition, due to high crystallisation rates it forms in submicron sizes, which provides an additional hardening effect at a room temperature.

Titanium and zirconium are introduced into the alloy in amounts not exceeding the maximum solubility in the aluminum matrix, which in turn, during rapid crystallisation in the process of printing, forms a supersaturated solid solution followed by the subsequent decomposition with the formation of nano-sized particles of the $Al_3X$ type. Besides, these elements act as a modifier that facilitates grain refinement during crystallisation and reduces the tendency to crack formation.

Silicon is introduced to form the eutectics in the material, which, in turn, contributes to improved printability. This eutectic phase is crystallised at the last moment filling up the interdendritic regions, increasing the resistance of the material to hot cracks.

The addition of manganese in the Al—Cu system facilitates hardening upon heating for quenching due to the precipitation of dispersoids of the $Al_{20}Cu_2Mn_3$ type, which have certain thermal stability and retain their hardening effect at temperatures above 200° C., when the active coarsening of the $Al_2Cu$ phase begins.

DETAILED DESCRIPTION

Example 1

Powders of aluminum alloys of various compositions in accordance with Table 1 were produced by gas atomisation in the nitrogen environment with a controlled content of oxygen.

TABLE 1

| No | Al | Cu | Mg | Zr | Ti | Ni | Mn | Ce | Si | V |
|---|---|---|---|---|---|---|---|---|---|---|
| 1 | Base | 6.00 | 0.2 | 0.60 | 0.20 | — | 0.37 | 0.70 | 3.7 | — |
| 2 | | 6.00 | 0.3 | 0.50 | 0.00 | — | 0.30 | 0.10 | 3.0 | — |
| 3 | | 6.20 | 0.2 | 0.60 | 0.18 | — | 0.37 | 0.60 | 2.9 | — |
| 4 | | 6.30 | 0.75 | 0.45 | 0.31 | — | 0.56 | 0.22 | 3.0 | — |
| 5 | | 6.50 | 0.5 | 0.10 | 0.45 | — | 0.48 | 0.30 | 3.7 | — |
| 6 | | 6.90 | 0.8 | 0.20 | 0.60 | — | 0.10 | 0.40 | 3.2 | — |
| 7 | | 7.00 | 0.6 | 0.00 | 0.90 | — | 0.85 | 0.50 | 3.7 | — |
| 8 | | 7.00 | 0.1 | 0.30 | 0.10 | — | 0.60 | 0.10 | 2.8 | — |
| Prototype | | 5.90 | 2.6 | 0.15 | — | 0.1 | 0.50 | — | 0.1 | 0.15 |

The melt was prepared in a gas-heated furnace. For preparation, aluminum of at least A7 grade in accordance with GOST 11069-2001, copper of the M1 grade in accordance with GOST 859-2001, electrolytic cerium of the TsEO grade, magnesium of the MG90 grade in accordance with GOST 804-93, silicon of the 4001 grade in accordance with GOST 2169-69, and binary master alloys of the rest of the elements were used. After preparing the melt and testing its chemical composition, the alloy was overheated to the temperature of 870 to 920° C. and then atomised in nitrogen with the oxygen content of 0.1% to 0.8% with the purpose of controlling the oxygen content in the powder and preventing its ignition in the process of dispersion.

During the atomisation process, the temperature was not allowed to drop below the value of ($T_{liquidus}$+100° C.), since it had been found that below this temperature, intermetallic compounds can form in the powder due to local cooling of the melt upon its contact with the nozzle and elements of the metal discharge launder, which are the cause of the process disruption (nozzle clogging, disruption of the chemical composition homogeneity and the powder structure, etc.).

The resulting powders were screened to separate the fraction of $D_{50}$=45±5 µm.

The selective laser melting (SLM) process for the obtained powder was performed on an SLM 280HL selective laser melting system in a nitrogen atmosphere, by varying the energy-speed printing parameters (laser power, scanning speed, track-to-track distance) in order to form a structure without hot cracks and with a controlled porosity level. The porosity of the synthesised material was determined on cube-shaped samples by the metallographic method using a Carl Zeiss Neophot optical microscope, for which the microsections were prepared using a standard technology and without any additional etching of the samples.

The microstructure of the material was studied using a Tescan Mira 3 scanning electron microscope and a JEOL 2100 transmission electron microscope. The phase composition was studied using a Brucker Advance D8 X-ray diffractometer.

Figure 1:
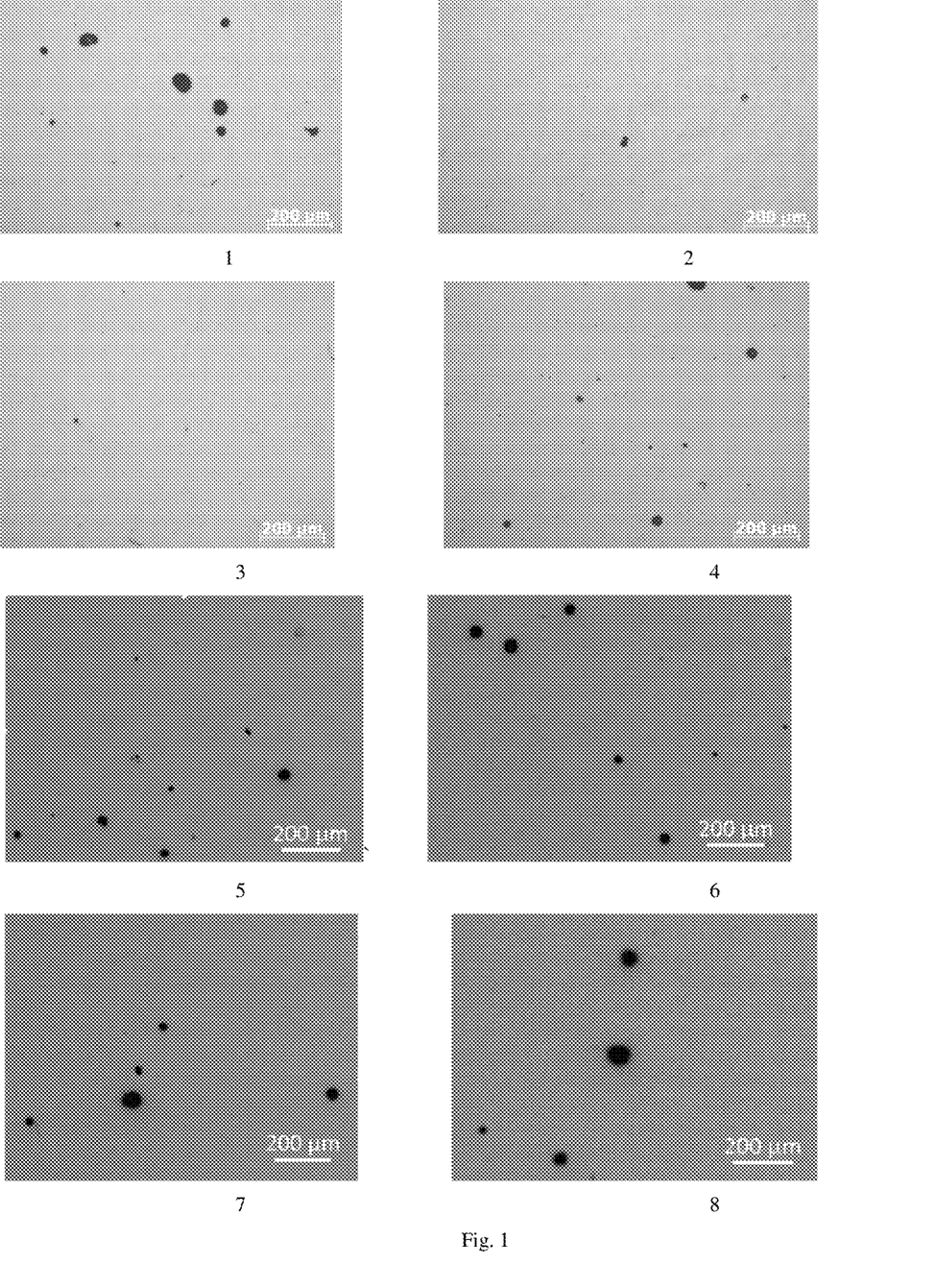
FIG. 1: Images of sample structures for alloys Nos 1 to 8 from Example 1, obtained by optical microscopy, showing that the level of porosity of the materials does not exceed 0.5 vol. % and that there are no cracks.

The results of the studies of the material structure by optical microscopy are shown in FIG. 1. According to the data obtained, the porosity of the materials for the most optimal modes did not exceed 0.5 vol. %.

Figure 2:
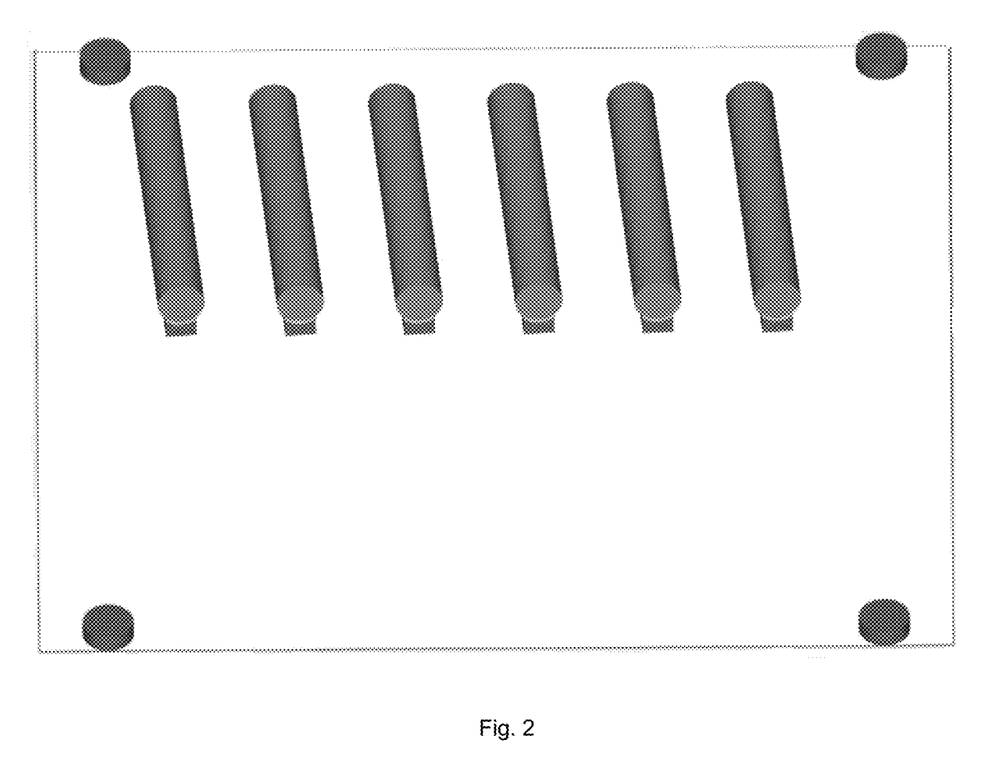
FIG. 2: Selective laser melting (SLM) process and specimens from the claimed AlCuCe alloy for testing the materials from Example 1.

Based on the parameters ensuring the lowest porosity, products were made in the form of blanks for samples for tensile tests in accordance with GOST 1497-84 and GOST 9651-84 (FIG. 2). Then the blanks were heat treated: heating to a temperature of 5° C. below the melting point, holding for at least 2 hours, followed by quenching in cold water, and artificial ageing at 170° C.

Figure 3:
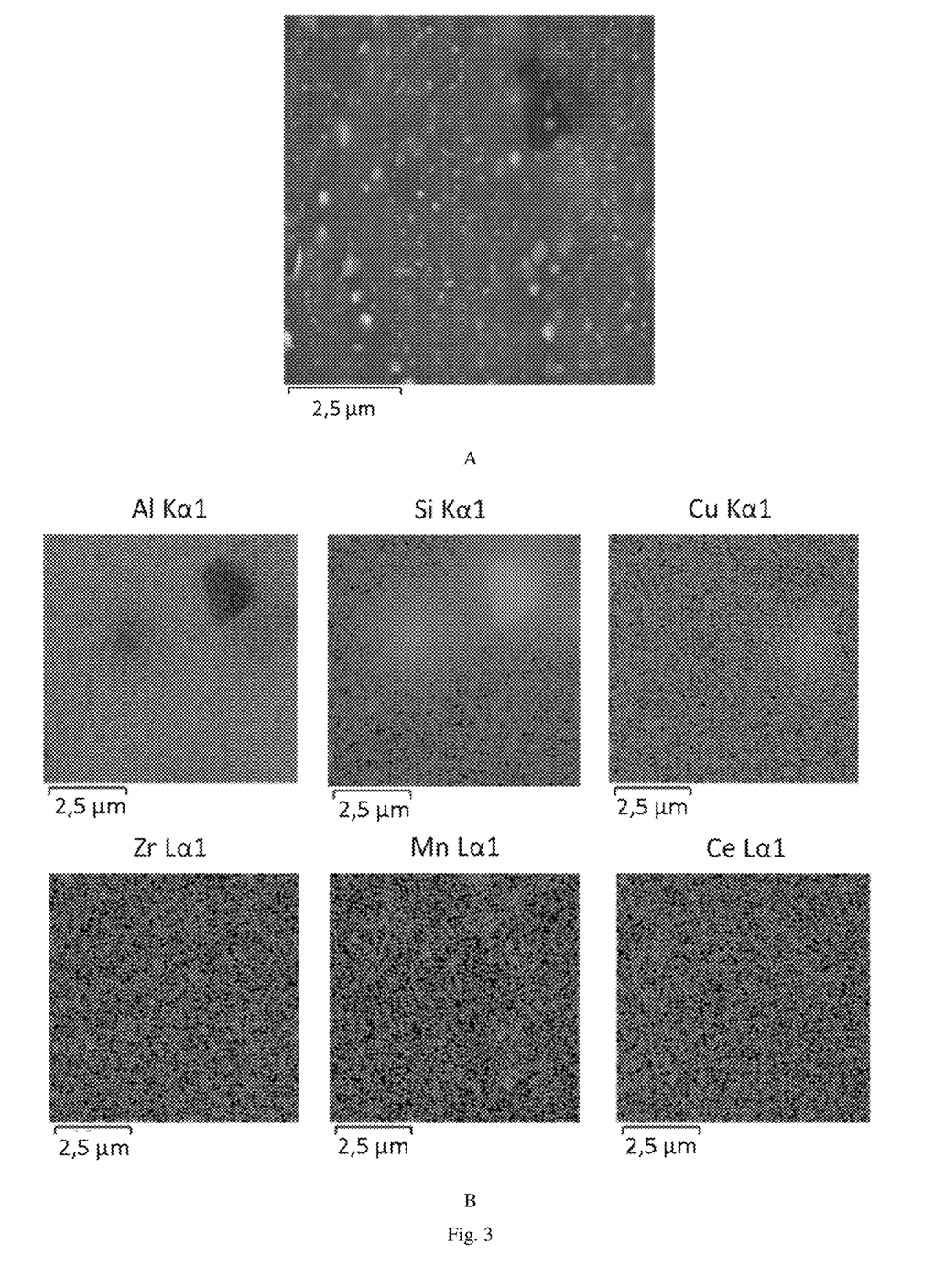
FIG. 3: Typical image of the microstructure of a material from the proposed AlCuCe alloy in a scanning electron microscope from Example 1 (A) and a map of the distribution of alloying elements (B) from Example 1.
Figure 4:
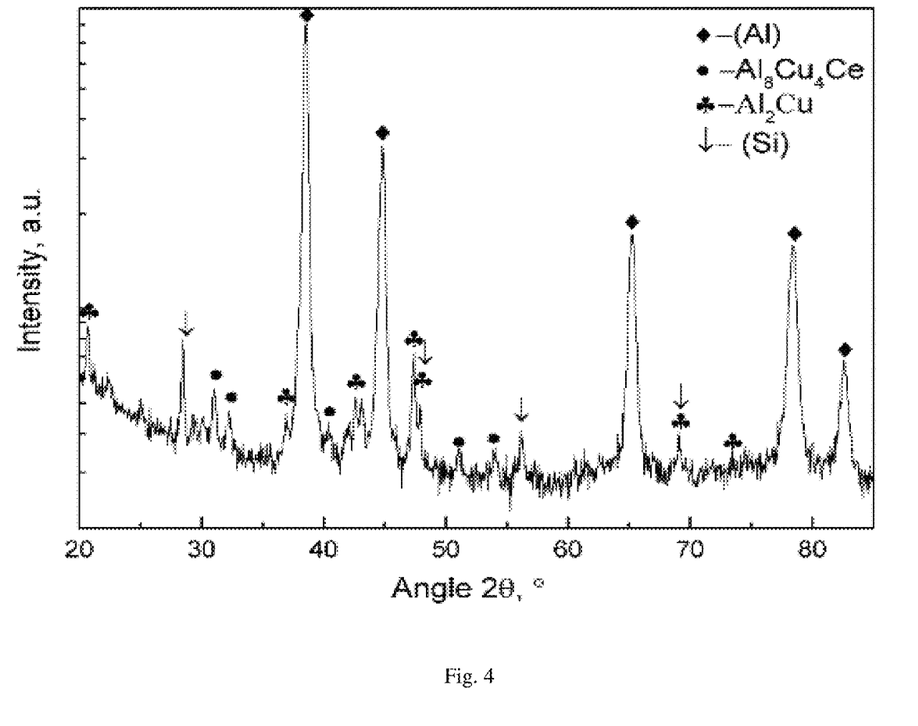
FIG. 4: Results of X-ray phase analysis of the AlCuCe material from Example 1 showing the phase composition of the alloy after heat treatment.
Figure 5:
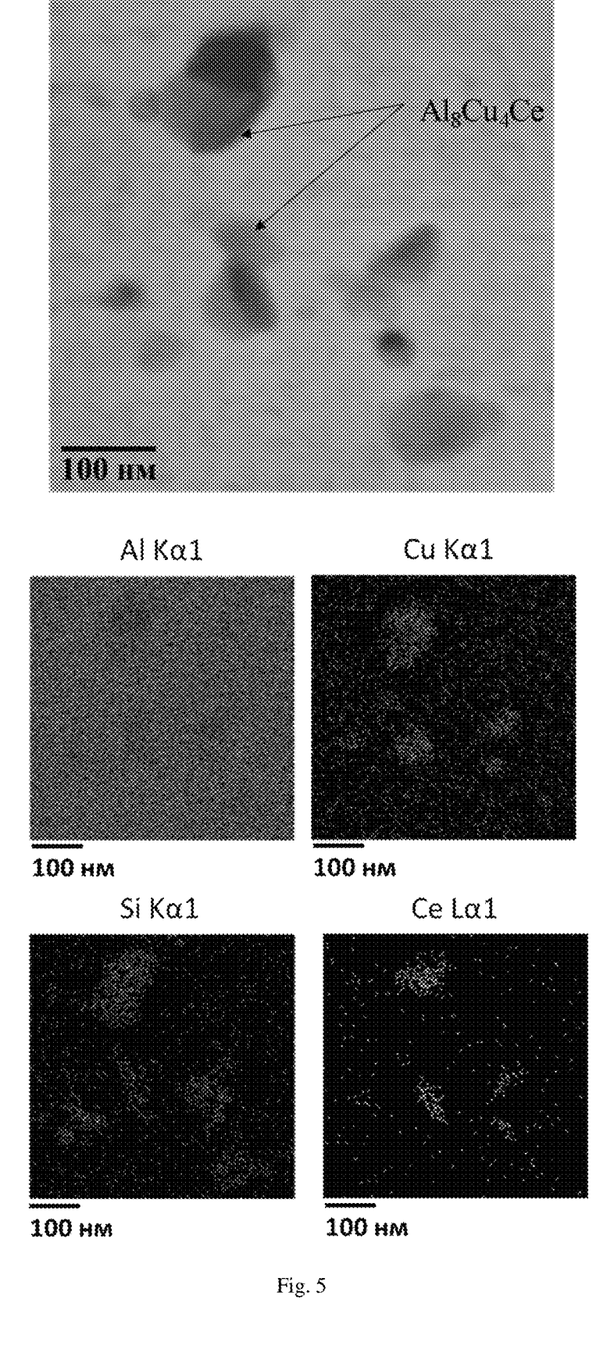
FIG. 5: A typical image of the microstructure of a material from the proposed AlCuCe alloy in a transmission electron microscope from Example 1 showing the presence of a strengthening thermally stable $Al_8Cu_4Ce$ phase and a map of the distribution of alloying elements (B).
Figure 6:
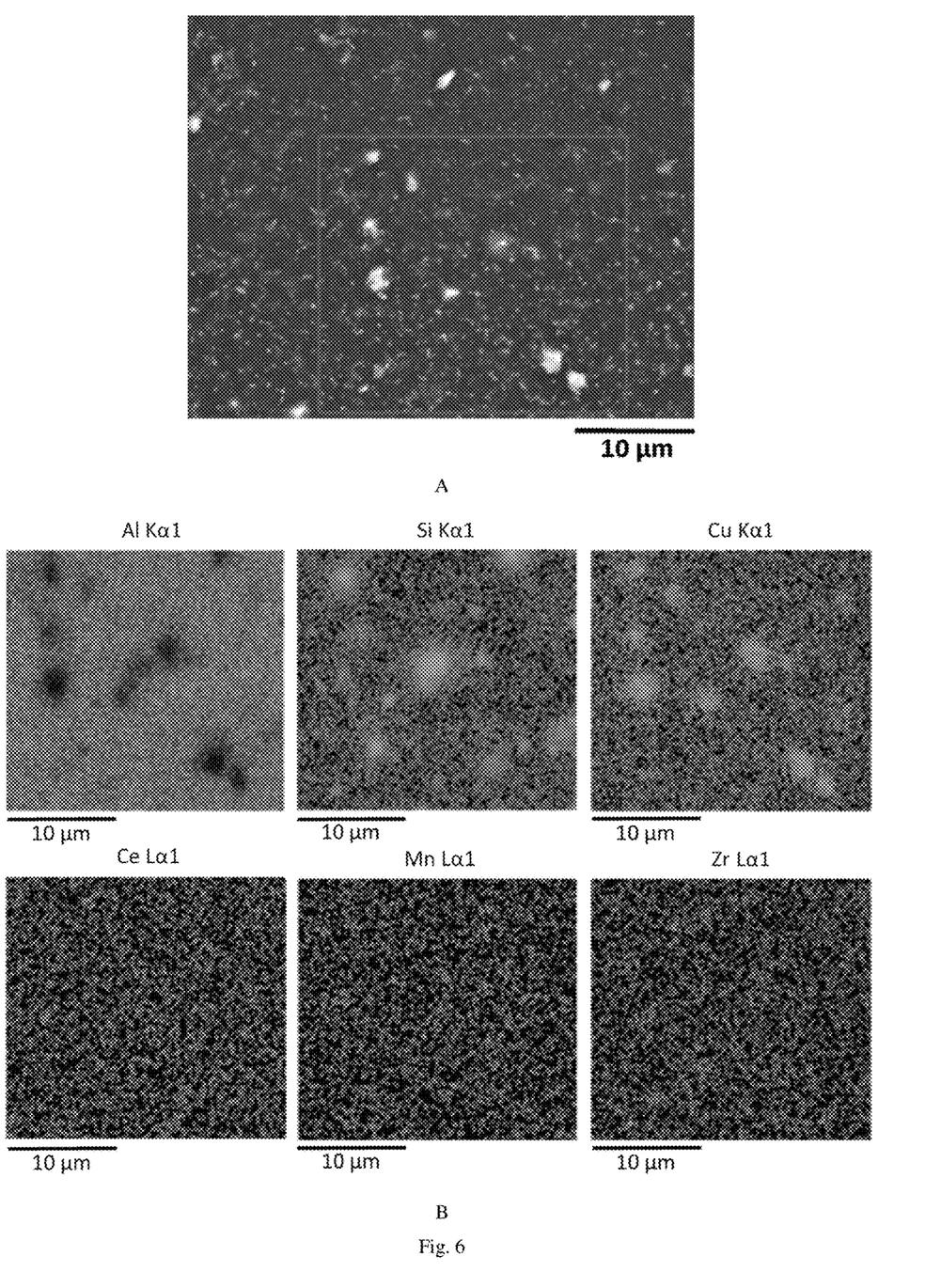
FIG. 6: Typical image of the microstructure of the proposed AlCuCe alloy in a scanning electron microscope (A) and maps of the distribution of alloying elements (B) showing that the size of silicon particles after heat treatment does not exceed 10 µm (Example 2).

The results of the study of the phase composition and the material structure are given in FIGS. 3, 4, and 5.

According to the results obtained, the material structure is an aluminum matrix with homogeneously distributed dispersed phases, which, according to the XRD results, are silicon (Si) and $Al_2Cu$ and $Al_8Cu_4Ce$ dispersoids. A distinctive feature of the material is the size of the $Al_8Cu_4Ce$ nanodispersed phase, which does not exceed 1 µm, which occurs due to the rapid crystallisation of the material (at a rate of at least $10^3$ K/s) during the SLM process (FIG. 4). This phase is characterised by dimensional stability before and after heat treatment, which indicates a high level of performance characteristics of the provided AlCuCe material.

The results of tensile tests of the samples at room and elevated (250° C.) temperatures are given in Table 2.

TABLE 2

Results of tests of mechanical properties

| No | Ultimate tensile strength at 20° C., MPa | Ultimate tensile strength at 250° C., MPa | Yield strength at 20° C., % | Yield strength at 250° C., % |
|---|---|---|---|---|
| 1 | 470 | 220 | 390 | 210 |
| 2 | 475 | 225 | 406 | 208 |
| 3 | 485 | 225 | 424 | 200 |
| 4 | 483 | 227 | 416 | 210 |
| 5 | 478 | 220 | 425 | 215 |
| 6 | 480 | 225 | 427 | 219 |
| 7 | 465 | 215 | 415 | 190 |
| 8 | 450 | 215 | 390 | 188 |
| Prototype | 400 | 200 | 345 | 159 |

Table 2 shows that the proposed material in the claimed range is characterised by an increased strength and yield compared to the prototype. Additional strengthening is ensured due to the presence of nanosize thermally stable hardening dispersoids in the material structure. In turn, the size of the silicon phase, which does not exceed 10 µm, allows maintaining the high plasticity characteristics of the alloy.

Thus, the achieved level of mechanical properties makes it promising to use the proposed material for production of parts of loaded elements operating under conditions of process and operational heating as analogues of casting and deformable materials.

Example 2

Powders of experimental compositions were obtained by a technology similar to Example 1. The chemical composition of the powders obtained is shown in Table 3. The composition of the alloys varied mainly in terms of the silicon content.

TABLE 3

Chemical composition of experimental alloys

| No | Al | Cu | Mg | Zr | Ti | Mn | Ce | Si |
|---|---|---|---|---|---|---|---|---|
| A | Base | 6.00 | 0.22 | 0.58 | 0.5 | 0.5 | 0.65 | 2.30 |
| B | | 6.00 | 0.3 | 0.53 | 0.43 | 0.40 | 0.66 | 2.50 |
| C | | 6.04 | 0.20 | 0.50 | 0.40 | 0.40 | 0.70 | 2.83 |
| D | | 6.10 | 0.25 | 0.48 | 0.45 | 0.44 | 0.66 | 2.9 |
| E | | 6.13 | 0.34 | 0.55 | 0.46 | 0.41 | 0.68 | 3.7 |
| F | | 6.07 | 0.27 | 0.49 | 0.40 | 0.45 | 0.63 | 3.8 |
| G | | 6.10 | 0.31 | 0.49 | 0.40 | 0.45 | 0.63 | 3.93 |

The printing process was implemented using the SLM Solutions 280 HL selective laser melting equipment. Printing was performed in a range of modes to select an optimal combination of synthesis parameters that ensure the minimum level of porosity and the absence of hot cracks. The structure of the printed samples was studied using an optical microscope similarly to Example 1. The material microstructure was analysed using a Tescan Vega 3LMH SEM scanning electron microscope with an attachment for energy dispersive analysis.

The porosity measuring results are shown in Table 4.

TABLE 4

Results of the study of AlCuCe material structure

| No | Porosity, vol. % | Macrodefect presence |
|---|---|---|
| A | 0.55 | Cracks |
| B | 0.49 | Cracks |
| C | 0.25 | None |
| D | 0.30 | None |
| E | 0.27 | None |
| F | 0.4 | None |
| G | 0.4 | None |

As can be seen from the results, cracks were found on alloys A and B, which were caused by poor casting properties of the material due to the low silicon content. The porosity of alloys from C to G obtained under optimal modes did not exceed 0.5 vol. %. Hot cracks are caused by an insufficient amount of silicon, which is the result of small eutectics amount. Therefore, in order to ensure the printability, it is preferable to maintain the silicon content of at least 2.8 wt. %.

The developed most optimal parameters were used to produce cylindrical blanks for tensile test samples at room temperature. The ready cylinders were heat treated and quenched at a temperature of 5° C. below the melting point and artificial ageing for maximum strength. Then the blanks were machined to be used as tensile test samples in accordance with GOST 1497-84. The tests were performed on an MTS Criterion testing system. The test results are given in Table 5.

TABLE 5

Mechanical properties of tension test samples in accordance with GOST 1497-84 in the XY temper after quenching and artificial ageing (average values)

| Alloy | Ultimate tensile strength, MPa | Yield strength, MPa | Elongation at break, % |
|---|---|---|---|
| C | 470 | 400 | 5.1 |
| D | 482 | 405 | 5.2 |
| E | 465 | 400 | 7.0 |
| F | 440 | 391 | 7.0 |
| G | 445 | 375 | 9.4 |

It can be seen from the results that an increased silicon content in F and G alloys leads to a decrease in the strength of the AlCuCe material, which is caused by the partial incorporation of copper into the composition of the silicon phase and, as a consequence, a decrease in its content in the solid solution. In turn, in alloys C, D, and E, the size of silicon particles does not exceed 10 μm, and materials obtained after quenching and artificial ageing for maximum strength are characterised by a combination of a high ultimate strength (at least 450 MPa) and plasticity at a room temperature and can be recommended to replace the known cast and wrought alloys of the Al—Cu system.

Example 3

An aluminum alloy powder according to Table 6 was obtained by atomising from a temperature exceeding the liquidus point of the alloy by 150° C. (to prevent the precipitation of primary intermetallic compounds in the melt) in a nitrogen atmosphere with the addition of oxygen in an amount of 0.3%, where the content of the chemical elements was controlled during their atomising in the melt:

TABLE 6

Chemical composition of melt before atomising

| No | Al | Cu | Mg | Zr | Ti | Ni | Mn | Ce | Si |
|---|---|---|---|---|---|---|---|---|---|
| 3 | base | 6.20 | 0.2 | 0.60 | 0.18 | — | 0.37 | 0.60 | 2.9 |

The resulting powder passed the standard screening procedure to obtain a fraction of +15/−63 μm with $D_{50}=45\pm2$ μm.

The chemical analysis of the resulting powder was determined by atomic emission spectroscopy; the gas content was determined using a gas analyser in a G8 Galileo system. According to the analysis results, the composition of the obtained powder corresponded to the melt composition, while the oxygen content was 0.038 wt. % and the nitrogen content was less than 0.0001 wt. %.

The process of selective laser melting (SLM) of the obtained powder was implemented on an SLM Solutions 280HL selective laser melting system in a nitrogen atmosphere under the following energy-speed printing parameters: scanning speed of 200 to 400 mm/s, laser power of 250 to 350 W, track-to-track distance of 0.15 to 0.20 mm at the maximum layer thickness of 50 μm. The material was synthesised with an additional heating of the platform at a temperature not exceeding 160° C.

Based on the above parameters, cylindrical blanks were produced as products to be used as samples for tensile tests at room and elevated temperatures in accordance with GOST 1497-84 and GOST 9651-84, respectively.

After the completion of the printing process, the products were heat treated: heating to a temperature of 5° C. below the melting point, holding for at least 2 hours followed by quenching in cold water, artificial ageing at the temperature of 170° C., and also machining with the purpose of obtaining test samples.

The test results are given in Table 7.

TABLE 7

Mechanical properties of materials

| Test temperature, ° C. | Ultimate tensile strength $\sigma_B$, MPa | Yield strength $\sigma_{0,2}$, MPa | Elongation at break $\delta_5$, % |
|---|---|---|---|
| 20 | 485 | 424 | 7.0 |
| 150 | 371 | 357 | 16.5 |
| 200 | 317 | 315 | 15.0 |
| 250 | 225 | 219 | 16.3 |
| 300 | 133 | 131 | 34.8 |
| 350 | 59 | 58 | 34.0 |

As can be seen from Table 7, the AlCuCe material proposed is able to maintain sufficiently high strength characteristics at elevated temperatures.

Figure 7:
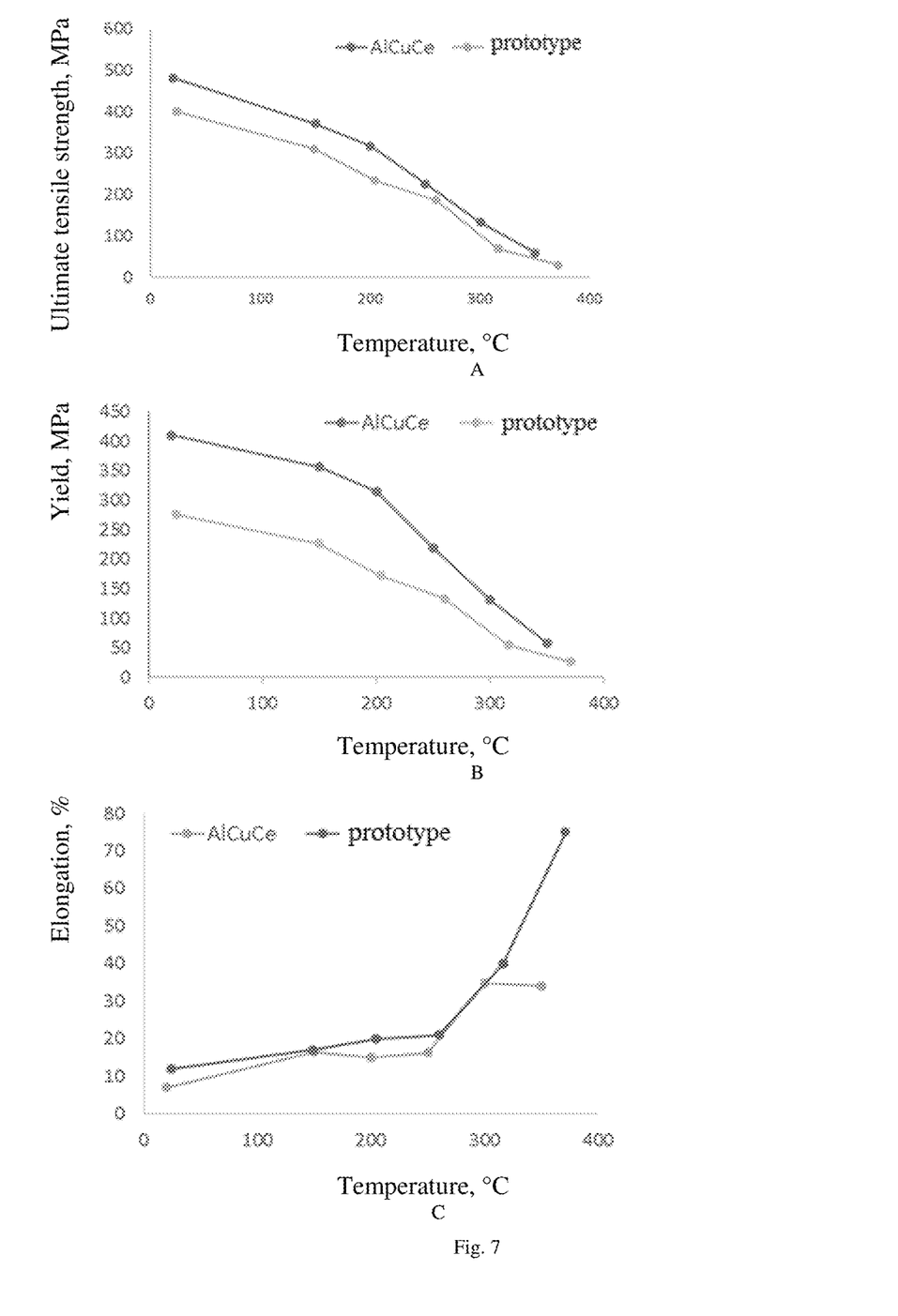
FIG. 7: Graphs of the dependence of the ultimate strength (A), the yield strength (B), the elongation at break (C) on the temperature of tensile tests in accordance with GOST 9651-84 showing an increased level of mechanical properties of the proposed alloy in comparison with the prototype when tested within the temperature range from the room temperature up to 350° C. (Example 3).

FIG. 7 shows graphs of changes in the level of mechanical properties under tensile strain (tensile strength, yield strength, and elongation) of the AlCuCe alloy in comparison with the prototype (US patent 2017/0016096 A1, the properties are given for a material with a chemical composition similar to that in Example 1). Compared with the prototype, the proposed AlCuCe material has increased strength characteristics in the temperature range of 20 to 350° C.

Further, with the specified characteristics, products were produced in the form of cylinders with a diameter of 18 mm and a length of 113 mm for rupture tests in accordance with GOST 10145-81. The tests were performed on an ATS Creep Tester at the temperature of 200° C.

Figure 8:
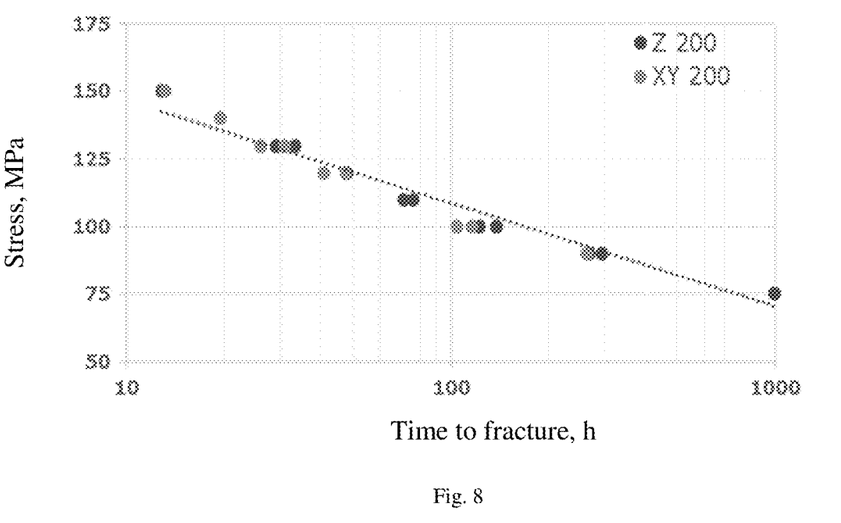
FIG. 8: A rupture strength curve of the AlCuCe material after heat treatment showing a good level of mechanical properties of the material under cyclic loading conditions at a temperature of 200° C. in a mutually perpendicular direction (Example 3).

Based on the results obtained, a creep rupture curve was built for the provided material (FIG. 8). It can be seen from the test results that the material has good ultimate creep rupture strength values based on 100 hours (100 MPa), and is promising for use in operating conditions under the combined effects of cyclic loads and elevated temperatures.

What is claimed is:

1. A powder aluminum material based on an aluminum alloy, the powder aluminum material comprising copper, magnesium, manganese, cerium, silicon, and also zirconium and/or titanium, wherein the powder aluminum material has a component ratio of (wt. %):

| | |
|---|---|
| Copper | 6.0 to 7.0 |
| Magnesium | 0.2 to 0.8 |
| Manganese | 0.3 to 1.0 |
| Cerium | 0.1 to 0.7 |
| Silicon | 2.8 to 3.7 |
| Zirconium and/or titanium | 0.45 to 0.9 |
| Aluminum and impurities | remainder, | wherein the powder aluminum material comprises thermally stable $Al_8Cu_4Ce$ dispersoids each having a size of less than 1 μm, the $Al_8Cu_4Ce$ dispersoids being formed at crystallisation rates of at least $10^3$ K/s to contribute to hardening of the powder aluminum material.

2. The powder aluminum material of claim 1, wherein an aluminum-based powder alloy is obtained by atomising the powder aluminum material using a melt superheated to a temperature of at least 150° C. above a liquidus point, by flow of an inert gas, with an oxygen content of 0.01 to 0.8 wt. %.

3. The powder aluminum material of claim 2, wherein at least one element from an element group of H, N, O, and Ar is included in a powder alloy generated using the powder aluminum material based on a purity of the inert gas and on ambient factors influencing the melt, wherein one of:
　at least one of the H, N, O, and Ar in an amount of up to 1 wt. % is present in the powder alloy; or
　at least one of the H, N, O, or Ar in an amount of between 0 to 0.5 wt. % is present in the powder alloy.

4. The powder aluminum material of claim 3, wherein the inert gas is nitrogen or argon.

5. The powder aluminum material of claim 4, wherein the powder aluminum material further comprises $D_{50}$ in a range of 5 to 150 μm, the powder aluminum material being used in additive technologies.

6. The powder aluminum material of claim 3, wherein the powder aluminum material further comprises $D_{50}$ in a range of 5 to 150 μm, the powder aluminum material being used in additive technologies.

7. The powder aluminum material of claim 2, wherein the powder aluminum material further comprises $D_{50}$ in a range of 5 to 150 μm, the powder aluminum material being used in additive technologies.

8. The powder aluminum material of claim 2, wherein the inert gas is nitrogen or argon.

9. The powder aluminum material of claim 1, wherein the powder aluminum material further comprises $D_{50}$ in a range of 5 to 150 μm, the powder aluminum material being used in additive technologies.

10. The powder aluminum material of claim 9, wherein the powder aluminum material is used to generate a product having an ultimate strength of at least 450 MPa at room temperature after quenching and artificial ageing.

\* \* \* \* \*